United States Patent [19]

Dimitroff et al.

[11] 4,402,183
[45] Sep. 6, 1983

[54] SLIDING PRESSURE FLASH TANK

[75] Inventors: Vladimir T. Dimitroff, Peabody; Darrell M. Silva, Revere; Bruce D. Taber, Boxford, all of Mass.

[73] Assignee: General Electric Company, Lynn, Mass.

[21] Appl. No.: 322,988

[22] Filed: Nov. 19, 1981

[51] Int. Cl.³ .............................................. F01K 13/02
[52] U.S. Cl. ........................................... 60/660; 60/664; 60/659; 60/39.182
[58] Field of Search ................. 60/660, 652, 664, 659, 60/39.182

[56]     References Cited
U.S. PATENT DOCUMENTS 3,220,193  11/1965  Strohmeyer, Jr. ................. 60/659
4,118,935  10/1981  Andersson ......................... 60/662
4,203,297  5/1980   Sakai et al. ....................... 60/660
4,253,308  3/1981   Eggenberger et al. ............ 60/664

Primary Examiner—Allen M. Ostrager
Attorney, Agent, or Firm—James W. Mitchell

[57]     ABSTRACT

This application is directed to a method and apparatus for improving the useful thermal yield of a saturated water flashed steam source over a wide range of steam turbine load. A flash tank pressure control in its simplest form maintains constant steam pressure with variable input water flow and inlet water enthalpy. This permits optimizing a design point relationship between water temperature, water flow, flash tank steam pressure and turbine stage pressure. If turbine stage pressure is used as a reference to reduce the flash tank steam pressure for part load operation, then more steam is available from a given flow of saturated water, and the throttling loss through the pressure control valve can be minimized.

9 Claims, 6 Drawing Figures

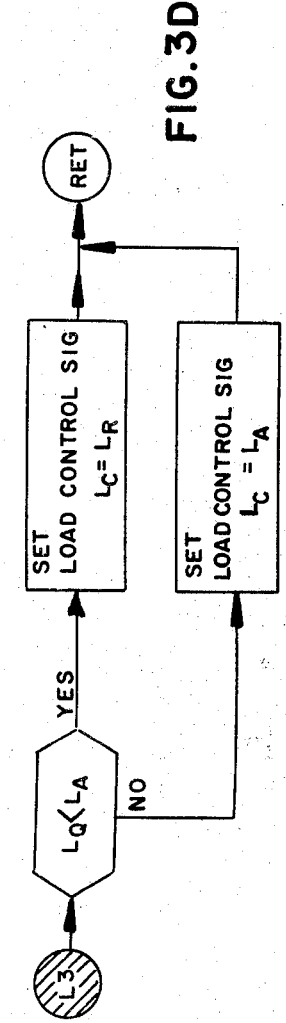
FIG. 3C
FIG. 3D

SLIDING PRESSURE FLASH TANK

FIELD OF THE INVENTION

This invention is directed in general to control systems for steam turbine power plants and in particular this invention is applicable to a power plant which includes a flash tank upstream from a turbine pressure stage.

BACKGROUND OF THE INVENTION

Combined cycle power plants are known for their high efficiency and relative flexibility in meeting peak load and base load power demands. The combined cycle power plant typically includes at least one gas turbine power plant, one steam turbine power plant and a heat recovery steam generator (HRSG) which thermally couples the two individual power plants to form a combined cycle power plant. The HRSG produces steam for the steam turbine by utilizing gas turbine exhaust gases in a heat exchange relation with turbine feedwater. The HRSG is a stack structure which includes serially arranged heating sections, which include a superheater, an evaporator and a high pressure economizer. The HRSG also includes a steam drum which is connected to the aforementioned heat exchange sections.

The foregoing arrangement is made more efficient by the inclusion of a feedwater preheating cycle which is used as a means for preheating and otherwise conditioning (deaerating) turbine condensate feedwater. A flash tank is included in this feedwater preheating circuit in order to provide steam to the deaerator for maintaining deaerator pressure to heat the feedwater to a level such that dew point corrosive chemical reactions cannot damage the heat recovery steam generator and to remove noncondensibles which can cause oxidation within piping and heat recovery steam generator tubing. The deaerator is operated at a constant pressure which is maintained by a pressure control valve located upstream from the deaerator. The flash tank also drains into the deaerator to provide direct contact heating of the turbine feedwater. Excess steam from the flash tank is directed to a low pressure admission and bypass system associated with the steam turbine. The low pressure admission and bypass system provides regulation of the flash tank pressure while directing the steam flow either to the condenser through the bypass valve or to a turbine low pressure section through the low pressure admission valve. In the prior art the flash tank pressure set point is a constant established by the value of the crossover steam pressure at peak steam turbine load. Mechanical design of the steam turbine in a tandem compound arrangement makes the crossover piping a convenient steam admission point.

At rated steam conditions, steam flow is required from the flash tank to the deaerator to maintain deaerator pressure. As plant load is decreased, condensate flow decreases while the flash tank water flow remains constant in volume as well as energy content. At somewhere between 70% to 80% turbine peak load, steam flow from the flash tank to the deaerator is no longer needed. Once the steam flow control valve to the deaerator is closed, pressure control of the deaerator is lost. The deaerator pressure is now primarily determined by the energy entering with the flash tank water flow. Damage could result in the deaerator with a sudden increase in turbine condensate flow to cause an uncontrolled drop in deaerator pressure and the subsequent eruptive boiling. The invention as proposed will provide a means for relieving the excess energy problem by promoting the increased production of steam which is then input into the low pressure admission section of the steam turbine. The benefit obtained is higher efficiency in the cycle while solving the problem of excess energy during less than peak operation.

SUMMARY OF THE INVENTION

In order to further optimize the foregoing feedwater preheater circuit, it has been found useful to vary the reference flash tank pressure in accordance with the load on the turbine rather than attempting to maintain flash tank pressure at a level necessary only for peak load conditions. This concept provides stable operation of the deaerator heater at a prescribed pressure level such that control can always be maintained by means of the steam inlet pressure control valve. The deaerator heater will always operate at a level where the steam requirement is sufficient to prevent the termination of steam flow to the deaerator due to an excess energy condition caused by flash tank drain water at low load. Flash tank pressure is governed as a function of admission pressure. The pressure in the flash tank at all turbine loads is admission pressure plus piping and associated losses. Because of the admission/flash tank pressure function the flash tank becomes a load following vessel which will not upset even under severe transient conditions. The steam admission valve for the turbine can be maintained at constant position for most operating conditions to admit whatever excess steam that is generated by the flash tank without system upset. The admission and bypass valve logic is such that these valves will modulate to maintain stable system operation at a minimum prescribed pressure while under low load conditions.

OBJECTS OF THE INVENTION

It is an object of the present invention to provide an improved performance power plant.

It is another object of the present invention to provide a control method and apparatus for a power plant which is especially applicable during periods of excess energy availability under low load conditions.

Another object of the invention is to provide a control system for a power plant utilizing a flash tank for steam production which control system will decrease throttling losses between the turbine and flash tank.

It is a further object of the invention to improve the reliability of a deaerating steam supply heater system by causing the flash tank to flash excess energy to steam so as to decrease the energy available within the flash tank water for uncontrolled flashing should rapid depressurization occur.

The novel features believed to be characteristic of the present invention are set forth in the appended claims. The invention itself, however, together with further objects and advantages thereof, may best be understood with reference to the following description taken in connection with the drawings.

BRIEF DESCRIPTION OF THE DRAWINGS

FIGS. 3A, 3B, 3C and 3D are flow charts in accordance with the method practiced in the present invention.

DETAILED DESCRIPTION OF THE INVENTION

Figure 1:
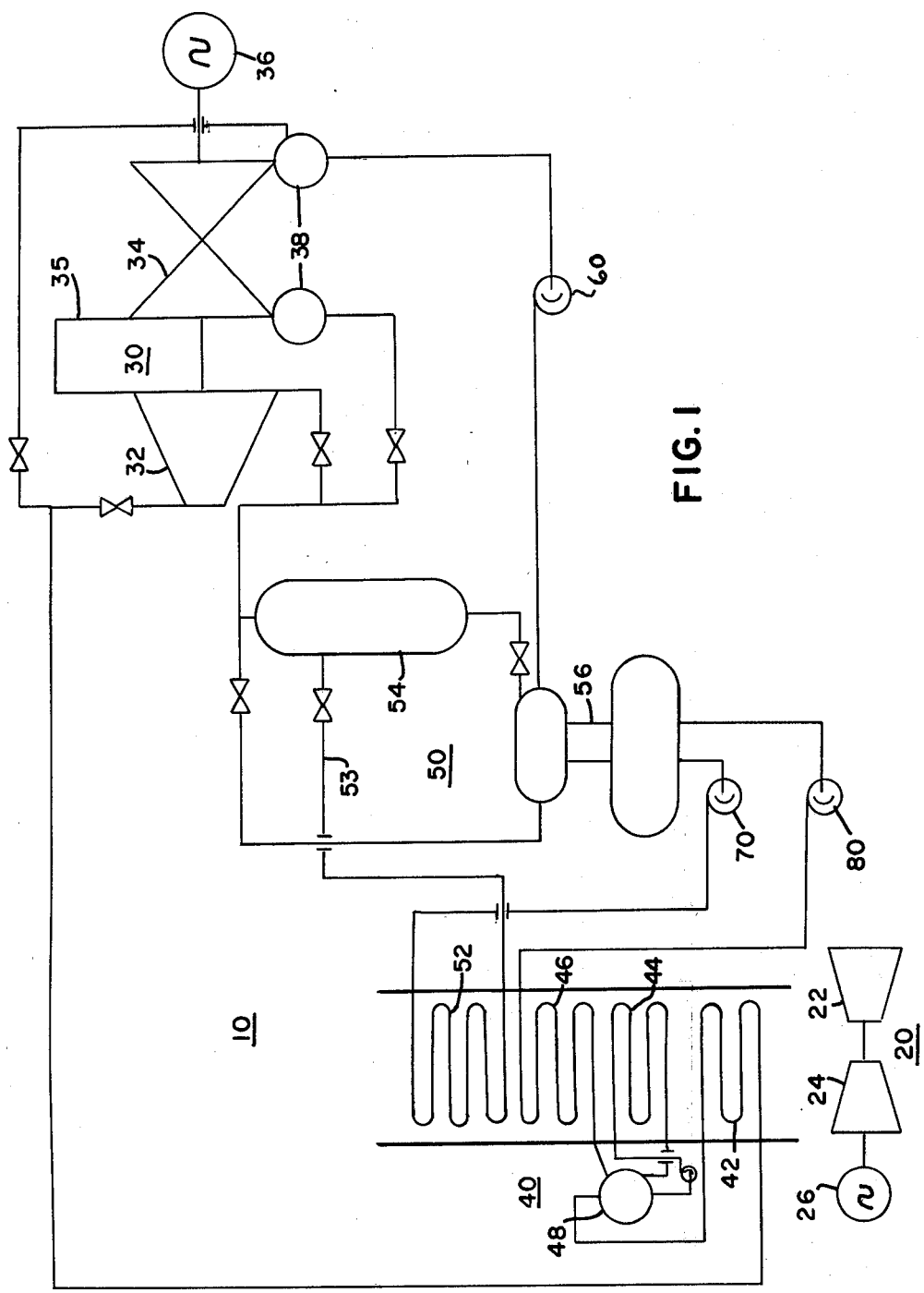
FIG. 1 is an overall view of a combined cycle power plant.

FIG. 1 shows a line diagram of a combined cycle power plant 10 which includes a gas turbine power plant 20, a steam turbine power plant 30 thermally interconnected by a heat recovery steam generator (HRSG) 40. The gas turbine power plant includes a compressor 22 which is driven by a gas turbine 24 and an electrical generator 26 also driven by the gas turbine. The steam turbine power plant includes a steam turbine including a high pressure section 32, a low pressure section 34 and an electrical generator 36. The low pressure section and the high pressure section are interconnected by crossover piping 35. The HRSG comprises several heat exchange sections including in ascending order with respect to the direction of gas turbine exhaust gas flow, a superheater 42, an evaporator 44 and a high pressure economizer 46. These heat exchangers are in communication through a steam drum 48.

In addition to the foregoing, it has been found advantageous to incorporate a feedwater preheater loop 50 into the combined cycle power plant which produces increased efficiency within the cycle by further extracting heat from the gas turbine exhaust gas flow. This feedwater preheater loop includes a low pressure economizer 52, a flash tank 54 and a deaerator-preheater 56.

Condensate pump 60 delivers water from the turbine condenser 38 to the deaerator 56 where it is deaerated and preheated. A pump 70 circulates the feedwater from the deaerator to the low pressure economizer 52 whereupon the heated feedwater is introduced into the flash tank 54. Boiler feedwater pump 80 circulates heated feedwater from the deaerator holding tank to the high pressure economizer 46.

Figure 2:
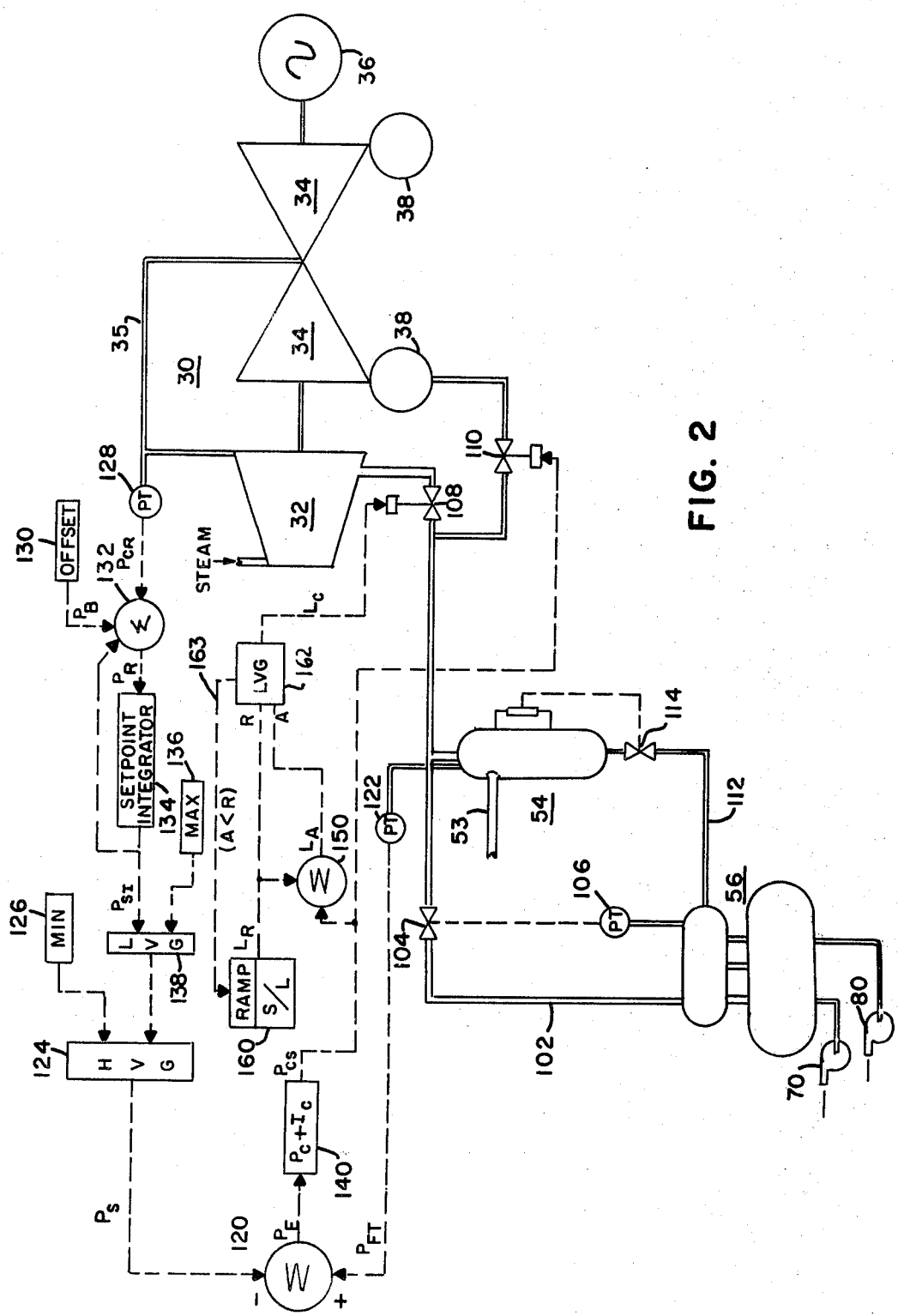
FIG. 2 is a schematic view of a preheater circuit and controls according to the present invention.
Figure 3A:
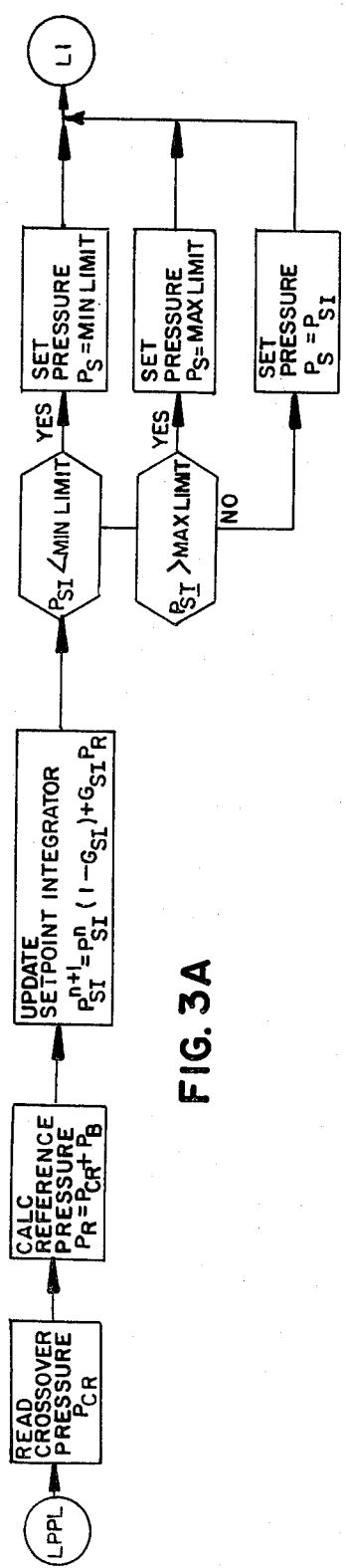
Figure 3B:
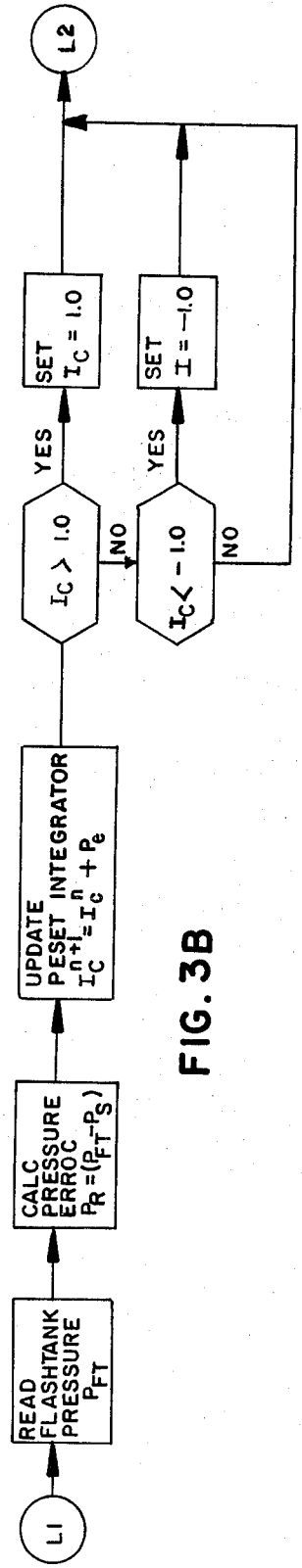

Referring now to FIG. 2, the control system and method in accordance with the present invention will be described. Elements present in FIG. 1 will be given like numerical designation in FIG. 2. The flash tank 54 receives heater water from the HRSG low pressure economizer (not shown) through conduit 53. As this heated water is dumped into the flash tank, a drop in pressure occurs which causes flashing or the production of steam. A portion of this steam is used to pressurize the deaerator through conduit 102 with control valve 104 being positioned by an input from pressure transducer 106 for holding the pressure in the deaerator at a constant pressure. The remaining portion of the available steam is passed to a low pressure admission stage of the steam turbine through low pressure admission valve 108 or to the turbine condenser through a low pressure bypass valve 110. Conduit 112 is a water line interconnecting the flash tank with the deaerator holding tank through level control valve 114.

The control system of the present invention is shown in functional-schematic form indicated by control boxes, arrows and dashed lines representing signal processing and signal flow. Starting from the summing junction 120 there are two signal inputs, $P_S$ the pressure setpoint and $P_{FT}$ the actual flash tank pressure. The latter is obtained from a pressure transducer 122 connected to the flash tank. The pressure set point $P_S$ is obtained as the output of high value gate (HVG) 124 and may either be a floor pressure or minimum pressure limit; or, a sliding pressure based upon the turbine crossover pressure. The floor pressure is based upon the minimum flash tank pressure at which the low pressure bypass valve will be allowed to open. This value in turn is based upon the deaerator sizing, turbine conditions and quantitative expectations of excess energy available from the combined cycle operation. For a steam turbine wherein the crossover pressure may ultimately rise to 130 psia, a floor pressure of 70 psia has been found to be suitable. This minimum pressure limit may be introduced into the signal flow through any suitable signal generator 126 and remains fixed.

A second input into the high value gate 124 is the pressure set point integrator $P_{SI}$ derived in the following manner. Pressure transducer 128 provides a signal output $P_{CR}$ which when processed is indicative of turbine crossover pressure. This signal $P_{CR}$ is supplemented by an offset signal $P_B$ from offset signal generator 130 which accounts for system losses such as pipe losses and pressure drops across valves in order to assure that the pressure set point $P_S$ based on the crossover pressure will in fact exceed the crossover pressure. The two signals are input into a signal summing junction 132 with the output $P_R$ representing a pressure reference.

The pressure reference $P_R$ is then input into a setpoint integrator 134 to provide an output signal $P_{SI}$ proportional to the time integral of the pressure change occurring in the turbine crossover. This signal is rate limited in the pressure falling direction in order to avoid flash tank upset which could cause boiling and surge in the flash tank water level. Maximum limit function 136 in combination with low value gate 138 assures that the pressure set point $P_S$ does not exceed flash tank limitations.

The output of summing junction 120 is a positive or negative signal $P_E$ representing the pressure error between the pressure set point $P_S$ and the flash tank pressure $P_{FT}$. The pressure error signal is input into proportional plus integral function 140 to produce a pressure control signal $P_{CS}$. The pressure control signal is utilized in a split pressure control circuit similar to the split range controller described in U.S. patent application Ser. No. 187,153 filed Sept. 15, 1980, for a Steam Turbine Control to Wagner and Priluck, assigned to the assignee of the present invention and incorporated herein by reference.

The remainder of the control circuit will be described in terms of a normal sequence of events including start-up, loading and unloading. As the power plant is started there is a certain sequence of events more fully described in the aforementioned Wagner and Priluck U.S. patent application Ser. No. 187,153. Prior to opening the low pressure bypass valve there is sufficient steam in the flash tank so that the flash tank is at least at floor pressure which may be on the order of 70 psia. Also, the main control valve has been opened so that there is steam in the turbine so that it is already under load and most likely at a crossover pressure $P_{CR}$ higher than the floor pressure or minimum limit 126. The low pressure bypass valve 110 and the admission control valve 108 are each controlled by a 0 to plus 10 volt signal which calls for close to open position respectively. Summing junction 150 combines the load control 160 load reference signal $L_R$ with the pressure control signal $P_{CS}$ to provide an adjusted load signal $L_A$. Signals $L_A$ and $L_R$ are gated in a low value gate 162 with the resultant output $L_C$ or load control signal for the admission control valve 108. The concept of a load reference signal is familiar to those having ordinary skill in the art and represents a computer generated load target based upon thermal and material considerations. This concept is disclosed in the aforementioned Wagner/Priluck patent application as well as in U.S. Pat. Nos. 4,104,908 and 4,046,002, all assigned to the assignee of the present invention and incorporated herein by reference.

The operation of the control is as follows. Assuming steam flow through the steam turbine because of operation under the control of the main control valve (FIG. 1, immediately upstream of high pressure section 32) a positive pressure error signal $P_E$ will indicate that the flash tank pressure exceeds the pressure set point $P_S$ (which may be at the minimum limit or above) and therefore the low pressure bypass valve must open in order to maintain pressure at the designated set point. This occurs while the admission control valve is still on load control and therefore the same positive signal being fed into the summer 150 will produce a load adjust output $L_A$ which exceeds the load reference $L_R$ and therefore has no effect on the load control $L_C$ because of low value gate 162.

As the admission control valve opens further the low pressure bypass valve will receive a decreasing positive control signal $P_{CS}$ calling for a more closed valve position to maintain flashtank pressure which is being depleted by the increased flow to the turbine crossover through the admission control valve 108. When the low pressure bypass valve 110 is completely closed, pressure control of the flash tank is transferred to the admission control valve. This occurs because the pressure control signal $P_{CS}$ goes negative causing the load reference to be ramped full positive which then means the load adjust signal $L_A$ will be passed through low value gate 162 to provide a load control signal $L_C$. A ramp signal 163 is responsible for uprating the speed/load signal whenever the output from summing junction 150 $L_A$ is less than the speed/load signal $L_R$ or ($A<R$). This indicates that the flash tank pressure is less than the pressure set point. If pressure loss continues, the negative signal $P_E$ will increase and result in a decreasing positive signal to be applied to the admission control valve thereby calling for a more closed position. As long as the flash tank pressure exceeds the pressure set point $P_S$ the admission control valve will be wide open and hence valve throttling losses are minimized.

As load is reduced on the steam turbine, the turbine crossover pressure will also be reduced. This change in turbine crossover pressure is reflected in a reduced pressure set point $P_S$ which then allows the flash tank pressure to fall with the proviso that it does not fall below the pressure set point or floor level. Moreover, a lag is introduced into this falling pressure set point to prevent uncontrolled boiling in the flash tank. This invention optimizes steam production while reducing the possibility of flash tank boiling and possible water carryover into the turbine under conditions of rapid system depressurization. Likewise the possibility of deaerator overpressurization is reduced. This is because some energy content of the flash tank liquid is flashed off as steam as the flash tank pressure is allowed to drop as a function of load. The efficiency of the cycle is correspondingly increased by the additional steam produced.

FIGS. 3A, 3B, 3C and 3D are flow diagrams illustrative of the method of the present invention and capable of being transformed into computer software by those persons having a skill in the computer arts. The program is called out as a low pressure pressure load (LPPL) and commences by reading the turbine crossover pressure $P_{CR}$ which is then offset by a pressure bias $P_B$ in order to assure that the pressure reference $P_R$ will exceed the actual crossover pressure. The set point integrator is updated with the new pressure reference to produce a new pressure set point integrator $P_{SI}$ output which is then compared with maximum and minimum set point values. The appropriate pressure set point $P_S$ is chosen depending on whether $P_{SI}$ is above or below or between the minimum-maximum limits. The $G_{SI}$ term in the set point integrator equation determines the maximum integrator reset rate which is chosen so as to avoid unacceptable surge conditions in the flash tank under rapid system depressurization. In other words, should rapid depressurization occur in the turbine, it is desirable to slowly bring the flash tank pressure down in order to avoid boiling and consequent surge in tank water level. It has been verified experimentally that if the maximum allowed rate of pressure set point decline were limited to 1 psi/sec, then the flash tank would be adequately protected.

The program between states $L_1$ and $L_2$ (FIG. 3B) is used to derive a pressure error signal $P_E$. The involved steps include reading the flash tank pressure $P_{FT}$ and subtracting the pressure set point $P_S$ from the flash tank pressure $P_{FT}$. The error signal limited to a value between $+1$ low pressure bypass full open and $-1$ admission control valve full closed.

The program between states $L_2$ and $L_3$ (FIG. 3C) calculates a control signal $P_{CS}$ on the basis of the error signal. The $P_{CS}$ value is applied to the low pressure bypass valve actuator and if positive will position the valve proportionately. If $P_{CS}$ is negative, the valve remains closed. The same signal $P_{CS}$ is used to calculate a load adjust signal $L_A$ by adding it to the load reference $L_R$.

The program at $L_3$ (FIG. 3D) completes the control system by determining whether the load adjust $L_A$ or $L_R$ will apply to the admission control valve as a load control signal $L_C$. The lower of the two signal dominates and if the pressure control signal $P_{CS}$ is negative, the load adjust signal $L_A$ will dominate to position the admission control valve.

While there has been shown what is considered to be a preferred embodiment of the present invention, other modification may occur to those skilled in the art; and it is intended to cover in the appended claims all such modifications as fall within the true spirit and scope of the invention.

What is claimed is:

1. In a steam turbine power plant wherein at least a portion of the total steam flow through a steam turbine is obtained from a flash tank connected to a steam admission point, a control system for regulating the flow of steam from the flash tank in accordance with steam turbine admission pressure comprising:

means generating a pressure reference signal based on turbine admission pressure;

means generating an actual pressure signal based on flash tank pressure;

means generating a first valve position signal based on the difference between the reference signal and the actual pressure signal;

means generating a second valve position signal based on the speed/load signal for the steam turbine;

a bypass valve responsive to the first valve position signal; and, a steam admission valve responsive to said second valve position signal when the bypass valve is open and to said first valve position signal after the bypass valve is closed.

2. The control system recited in claim 1 further comprising:
summing means receiving said first and second valve position signals and providing a third valve position signal; and,
a low value gate receiving said second and third valve position signals, said steam admission valve being positioned by the lower of either the second or third valve position signal.

3. The control system recited in claim 1 wherein the pressure reference signal comprises:
a first signal portion proportional to the steam admission pressure;
a second signal portion comprising an offset based upon anticipated losses between the flash-tank and steam admission point;
a maximum limit and low value gate to limit the upper range of the pressure reference signal; and,
a minimum limit and high value gate to limit the lower range of the pressure reference signal.

4. The control system recited in claim 1 wherein the steam turbine includes several turbine stages connected together along a common rotor and wherein steam is transferred from a high pressure stage to a low pressure stage through a crossover pipe and wherein the steam admission point is at the crossover pipe.

5. In a steam turbine power plant wherein at least a portion of the total steam flow through the steam turbine is obtained from a flash tank and wherein the flow of steam from the flash tank is controlled in part by a steam admission valve and a bypass valve, a method of adjusting the respective valve settings in accordance with available steam and turbine load comprising the steps of:
measuring steam pressure at the turbine steam admission point to establish a pressure set point;
measuring steam pressure in the flash tank;
opening the bypass valve to maintain flash tank pressure at the pressure set point;
opening the steam admission valve in response to a turbine load signal;
closing the bypass valve to maintain flash tank pressure at the pressure set point;
transferring pressure control to the steam admission valve;
ramping the steam admission control valve wide open as long as the flash tank pressure exceeds the pressure set point; and,
adjusting the steam admission control valve closed to maintain the flash tank pressure at least at the pressure set point.

6. The method recited in claim 5 further comprising the steps of:
increasing the turbine pressure set point by a predetermined offset to assure that the pressure set point is always above the actual turbine steam admission pressure.

7. The method recited in claim 5 further comprising the steps of:
comparing the turbine pressure set point with minimum and maximum pressure limits; and,
setting the pressure set point to a maximum or minimum limit whenever the steam admission pressure exceeds or falls below the limits respectively.

8. In a combined cycle power plant including at least one gas turbine and at least one steam turbine thermally interconnected through an HRSG; a turbine feedwater preheating cycle including an economizer, flash tank and deaerator; an improved control system for passing steam from the flash tank to a low pressure steam turbine section wherein the improvement comprises:
means for measuring turbine admission steam pressure to define a sliding pressure set point;
means for measuring actual flash tank pressure to provide a pressure feedback;
a bypass valve connected between the flash tank and turbine for maintaining a minimum flash tank pressure at start up;
an admission control valve connected between the flash tank and turbine for initially adjusting the steam flow in accordance with plant steam/load requirements;
a split pressure control circuit in combination with said bypass valve and said admission control valve whereby after said bypass valve is closed, said admission control valve follows the sliding pressure set point.

9. The improved control system recited in claim 8 further comprising:
ramping means for switching speed/load control to pressure control after the bypass valve is closed.

* * * * *